United States Patent [19]

Wernicke

[11] Patent Number: 5,062,587
[45] Date of Patent: Nov. 5, 1991

[54] LANDING GEAR FOR A TAIL SITTING AIRPLANE

[76] Inventor: Kenneth G. Wernicke, 409 Circleview North, Hurst, Tex. 76054

[21] Appl. No.: 558,602

[22] Filed: Jul. 27, 1990

[51] Int. Cl.⁵ .............................................. B64C 29/02
[52] U.S. Cl. ................................ 244/7 B; 244/100 R; 244/17.17
[58] Field of Search ................. 244/7 R, 7 B, 100 R, 244/17.17; D12/326

[56] References Cited

U.S. PATENT DOCUMENTS

| | | | |
|---|---|---|---|
| 2,058,678 | 10/1936 | Fry | 244/7 B |
| 2,382,460 | 8/1945 | Young | |
| 2,397,632 | 4/1946 | Stuart | 244/7 B |
| 2,578,578 | 12/1951 | Myers | |
| 2,622,826 | 12/1952 | Prince | |
| 2,794,609 | 6/1957 | Perry | 244/7 B |
| 3,096,952 | 7/1963 | Roppel | |
| 3,116,040 | 12/1963 | Petrides | |
| 3,120,359 | 2/1964 | Sprecher | |

FOREIGN PATENT DOCUMENTS 970425 9/1964 United Kingdom ............. 244/17.17

OTHER PUBLICATIONS

Vertical Take-Off & Landing, Mike J. Rogers, Copyright 1989.

Primary Examiner—Galen Barefoot
Attorney, Agent, or Firm—James E. Bradley

[57] ABSTRACT

A tail sitter aircraft of a type that takes off and lands on its tail section with the fuselage pointed vertically upward has landing gears located on its rearward end. Each of the landing gears is mounted on a support axis which is offset from the fuselage axis and which intersects a wheel axle at a 90 degree angle. The landing gears are located on the tail section and spaced around the fuselage axis. Two of the landing gears which are opposite each other will be locked so that they can roll only along a single straight line. The other two landing gears, which are also spaced opposite each other, are locked so that they can roll only on a single straight line. The straight lines are perpendicular to each other.

8 Claims, 2 Drawing Sheets

LANDING GEAR FOR A TAIL SITTING AIRPLANE

BACKGROUND OF THE INVENTION

1. Field of the Invention:

This invention relates in general to airplanes which will take off and land on the tail section with the nose up and the fuselage vertical, and in particular to a landing gear assembly for use with such an airplane.

2. Description of the Prior Art:

Tail sitting airplanes have been known in the patented art and technical literature for some time. Prototypes have been developed. However, there has been no production of this type of airplane.

A tail sitting airplane lands and takes off on its tail section. The landing gear will extend rearward from the tail section for supporting the airplane in a vertical position. The fuselage will point upward during the takeoff and landing position.

Typically, the prior art designs show four landing gears, each with a castor type wheel. Each wheel is free to turn about an axis perpendicular to the wheel axle. This freedom to turn allows the airplane to be moved translationally along the ground while pointed vertically.

Castor type wheels present difficulties while landing. Castoring wheels are designed to allow the wheels to line up with the direction of motion so that they will roll and provide little resistance to the direction of motion. Little resistance to the direction of motion is essential to the safe landing of a tail sitter airplane. Any large amount of resistance to the direction of motion can cause the tail sitter airplane to tip over. Freedom of movement in the direction of motion is essential to a safe landing. If the castoring wheel should fail to align because of binding about the castoring axis, a high resistance could develop and cause the airplane to tip over.

Once the airplane has firmly landed, it is then desirable that the landing gear prevent translational motion for situations of high winds and/or sloping landing areas such as those that occur on the pitching and rolling decks of ships at sea. If wheel brakes are to be used to prevent this translational motion, they must be applied in exactly the right sequence, which is difficult to do. Otherwise, a disastrous tip over or rolling off of the deck could occur during a bouncy landing.

SUMMARY OF THE INVENTION

In this invention, the airplane has two pairs of landing gears. Each landing gear has a wheel that is rotatably mounted about a wheel axle. The landing gears extend rearward of the tail section and are offset from the fuselage axis. The landing gears are spaced so that they will support the fuselage in an upright position with the fuselage axis pointed vertically.

A retaining means will prevent each wheel from turning about its support shaft. Each wheel is locked so that it will roll only in one direction, along a straight line. The wheels of each pair have parallel axles, consequently, they will roll only on the same straight line. The axles of one pair are perpendicular to the axles of the other pair. Consequently, the straight path line of one pair will be perpendicular to the straight path line of the other pair.

DETAILED DESCRIPTION OF THE INVENTION

Figure 1:
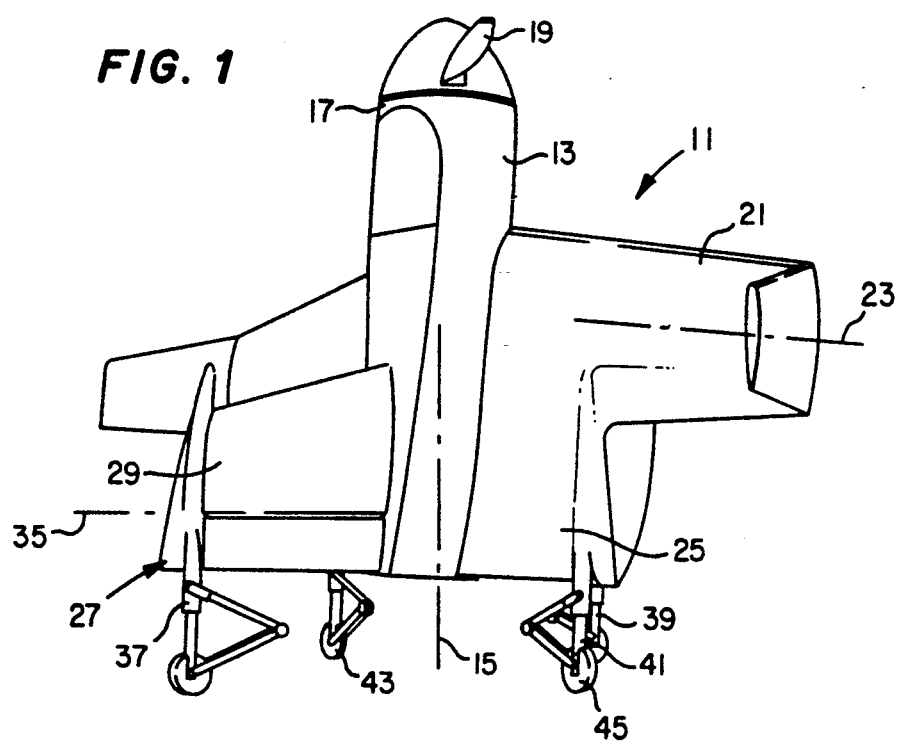
FIG. 1 is a simplified perspective view illustrating a tail sitter airplane constructed in accordance with this invention.

Referring to FIG. 1, aircraft 11 may be of various types. It is designed particularly to be a tail sitter airplane. In the embodiment shown, the particular aircraft 11 is an unmanned airplane controlled remotely for surveillance. Aircraft 11 has a fuselage 13 with a longitudinal or fuselage axis 15. Nose 17 locates on the forward end. In the embodiment shown, the propulsion means comprises a propeller 19 located on the nose 17.

Wings 21 extend laterally outward from the fuselage 13. Wings 21 have a wing axis 23 that is perpendicular to the fuselage axis 15. Wing extensions 25 extend rearward from the wings 21 in the embodiment shown.

Aircraft 11 has a tail section 27. Tail section 27 includes two vertical stabilizers 29, 31. Vertical stabilizer 29 extends upward from the rearward end of fuselage 13 when aircraft 11 is in horizontal flight. Vertical stabilizer 31 extends downward from the tail section 27 when aircraft 11 is in horizontal flight. A pod 33 will contain cameras and other instruments for performing surveillance. Pod 33 locates on the lower end of lower vertical stabilizer 31. The vertical stabilizers 29, 31 are in the same plane with each other. This plane contains a vertical stabilizer axis 35. Axis 35 is preferably perpendicular to the wing axis 23 and also perpendicular to the fuselage axis 15.

An upper landing gear 37 mounts to the upper end of the vertical stabilizer 29. Upper landing gear 37 extends rearward from the tail section 27. A lower landing gear 39 extends from the lower vertical stabilizer 31. The upper and lower landing gears 37, 39 are preferably equidistant from opposite sides of the fuselage axis 15. The terms "upper" and "lower" refer to the aircraft when flying horizontally.

Lateral landing gears 41, 43 extend rearward from the wing extensions 25. The right lateral gear 41 locates on the right side of the aircraft 11, and the left lateral landing gear 43 locates on the left side. The lateral landing gears 41, 43 extend rearward of wing extensions 25 and are preferably equidistant from the fuselage axis 15. This distance is the same as the upper and lower landing gears 37, 39 in the preferred embodiment.

Figure 2:
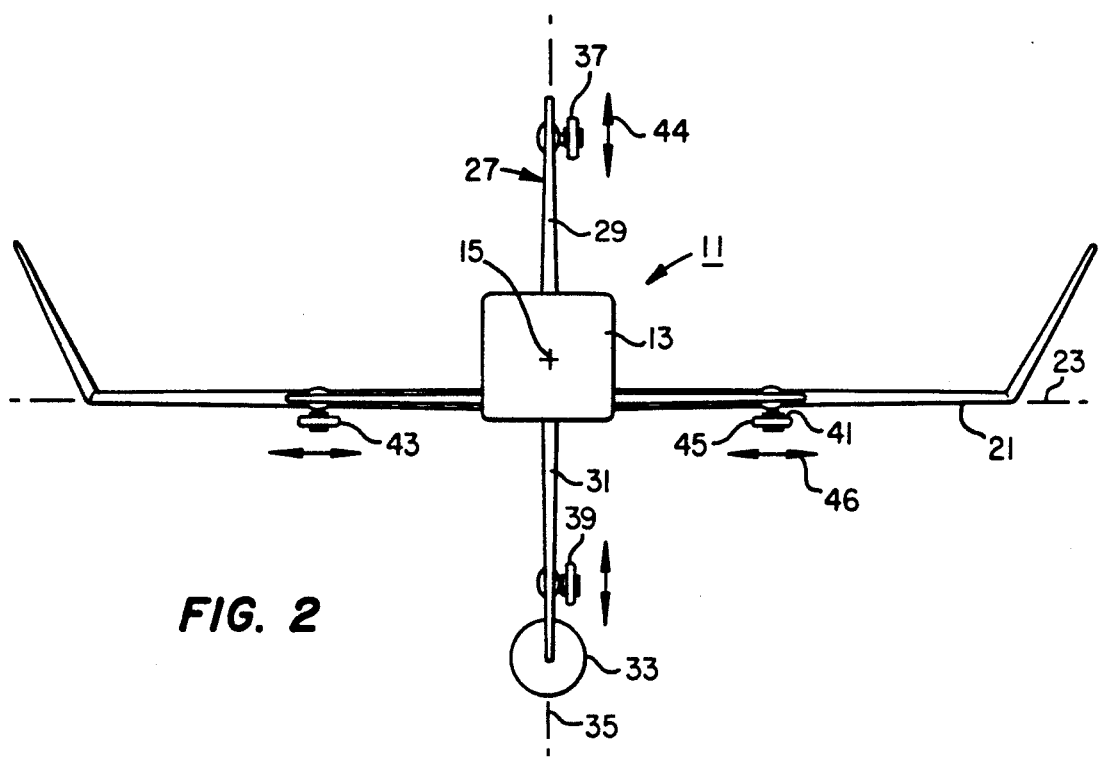
FIG. 2 is a bottom view of the airplane of FIG. 1, with details of the fuselage and propeller omitted.

As shown in FIG. 2, the upper and lower landing gears 37, 39 are approximately 180 degrees from each other relative to the fuselage axis 15. Also, the lateral landing gears 41, 43 are approximately 180 degrees from each other relative to the fuselage axis 15. The landing gears 37, 39, 41, 43 will thus be spaced about 90 degrees apart.

Referring still to FIG. 2, the upper and lower landing gears 37, 39 are locked from turning so that they will roll only in the direction according to arrow 44. They will roll only along a straight line that is parallel with the vertical stabilizer axis 35. Similarly, the lateral landing gears 41, 43 are locked from turning so that they will roll only in the direction indicated by arrow 46. This direction is a straight line that is parallel to the wing axis 23 and perpendicular to the vertical stabilizer axis 35. Because of this locking arrangement, once the four landing gears 37, 39, 41, 43 are located on the ground, the aircraft 11 cannot roll along the ground in any direction. It cannot move translationally.

Figure 3:
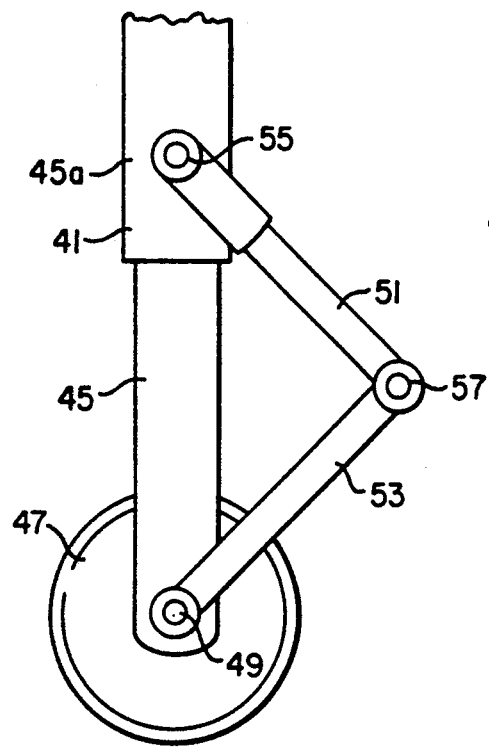
FIG. 3 is an enlarged view of the landing gear that is located on the right side of the airplane of FIG. 1.

FIG. 3 illustrates a simplified manner in which the right lateral landing gear 41 is locked against turning so that it will roll only in one direction. The other landing gears 37, 39 and 43 are identical and thus not shown. Landing gear 41 has a support shaft 45. Support shaft 45 extends rearward from wing extension 25 (FIG. 1). The support shaft 45 extends parallel with the fuselage axis 15. The support shaft 45 for the two lateral landing gears 41, 43 (FIG. 2) will be in a plane that is parallel to a plane containing the wing axis 23. The support shaft 45 for the two upper and lower landing gears 37, 39 will be in a plane that is parallel with a plane containing the vertical stabilizer axis 35.

Support shaft 45 is a telescoping shock absorbing type member. It has a lower portion that will telescope up and down relative to an upper section 45a. The support shaft 45 contains a shock absorbing fluid. A wheel 47 rotatably mounts to the lower end of the support shaft 45. Wheel 47 rotates on an axle 49. Axle 49 is perpendicular to the axis of the support shaft 45.

The retaining means for preventing the wheel 47 from turning about the support shaft 45 includes an upper link 51 and a lower link 53. The links 51, 53 are connected on the upper end by pivot pin 55 to the support shaft upper section 45a. The lower link 53 is connected on its lower end to the axle 49. A pivot pin 57 connects the two links 51, 53 in a general "L" shaped configuration. The links 51, 53 will pivot to allow extension and retraction of the telescoping support shaft 45.

In the simplified embodiment shown, the support shaft upper section 45a rigidly joins to the aircraft 11. It cannot rotate. Consequently, the link bars 51, 53 will prevent the axle 49 from turning about the axis of the support shaft 45. If desired, a provision can be made to selectively disconnect the retaining means and allow turning of the wheel 47 about the support shaft 45 for ground handling. In that case, the lower portion of the support shaft 45 could be made rotatable relative to the upper section 45a. A decoupling means could be used to readily disconnect the link bars 51, 53 from connecting the upper section 45a to the axle 49.

Figure 4:
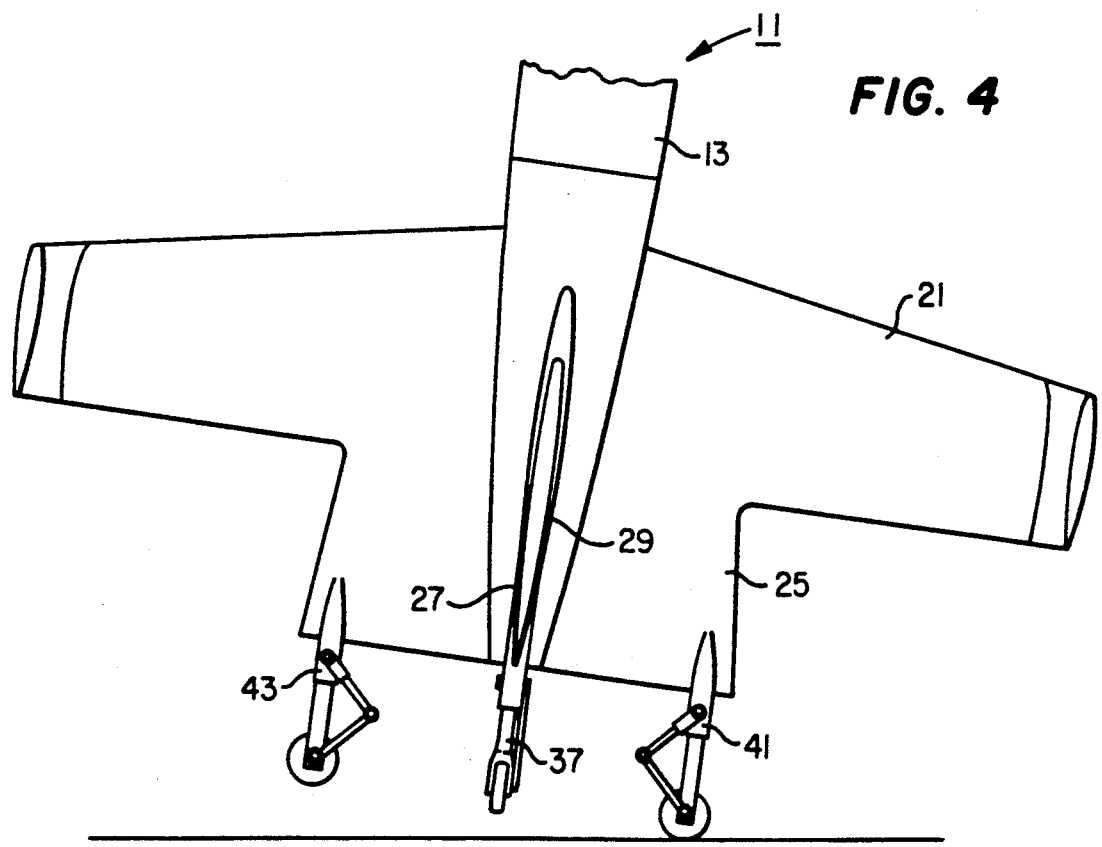
FIG. 4 is a side view illustrating the airplane of FIG. 1 during a landing.

FIG. 4 illustrates the operation of aircraft 11 during landing. It will be difficult to land precisely on all four of the landing gears 37, 39, 41 and 43 simultaneously. The right landing gear 41 is shown touching the ground first. Because the wheel 47 of the right landing gear 41 is fixed so that it will roll only parallel with the wing axis 23, it will not bind and cause further tilting. Rather, when touching on this wheel, the airplane will roll a short distance to the right until the pilot corrects the tilt and the other landing gears 37, 39 and 43 touch the ground. When tilted, as shown in FIG. 4, the two landing gears 37, 39, which are locked perpendicular to landing gear 41, will be spaced above the ground. They will not provide resistance to roll until they also touch the ground. If the airplane contacted the ground with the left lateral landing gear 41 touching first, the same would apply.

If the airplane landed with the upper landing gear 37 touching the ground first, then the airplane would be tilted slightly forward. The wheel 47 of the upper landing gear 37 would allow the aircraft 11 to roll forward as indicated by arrow 44 in FIG. 2, until this tilting corrected itself. Similarly, if the airplane tilted rearward slightly such that the lower landing gear 39 touched first, the same would apply. Once on the ground, the aircraft 11 cannot roll in any direction.

The invention has significant advantages. The wheels will not bind and result in the airplane tipping further in one direction. The wheels allow the pilot to correct the tilting of the aircraft easily. The wheels prevent the airplane from rolling once all four have touched the ground. This prevents the airplane from moving about on a deck of a ship at the time of landing.

While the invention has been shown in only one of its forms, it should be apparent to those skilled in the art that it is not so limited, but is susceptible to various changes without departing from the scope of the invention.

I claim:

1. In a tail sitter aircraft of a type having a fuselage with a longitudinal fuselage axis, a nose on its forward end and a tail section on its rearward end, a pair of wings extending laterally from the fuselage axis, a propulsion means for propelling the aircraft, the aircraft being capable of landing and taking off on the tail section with the nose up, an improved landing gear means, comprising in combination:

two pairs of landing gears, each landing gear having a wheel rotatably mounted about a wheel axle, each wheel carried by the aircraft and extending rearward of the tail section along a support axis which is offset from the fuselage axis and which intersects the wheel axle at a 90 degree angle, the landing gears within each pair being spaced opposite from each other relative to the fuselage axis, each landing gear within each pair being angularly spaced from an adjacent landing gear in the other pair relative to the fuselage axis; and means for preventing each wheel of the landing gears from turning about its support axis so that each wheel will roll only along a straight line, and for aligning the wheels of each pair so that the wheels of each pair will roll only along the same straight line, the straight line of one pair intersecting the straight line of the other pair, to reduce the tendency of the aircraft to tip over when landing and for preventing the aircraft from moving translationally when resting on all of the landing gears.

2. The aircraft according to claim 1 wherein the straight line of one of the pairs of landing gears intersects the straight line of the other of the pairs of landing gears.

3. The aircraft according to claim 1 wherein one of the straight lines is substantially parallel with the wings and the other of the straight lines is substantially perpendicular to the wings.

4. The aircraft according to claim 1 wherein the tail section has a vertical stabilizer and wherein one pair of the landing gears are located substantially in a plane parallel with the vertical stabilizer and the other pair of the landing gears are located in a plane substantially perpendicular to the vertical stabilizer.

5. The aircraft according to claim 4 wherein the straight line for the landing gears contained in the plane parallel to the vertical stabilizer is parallel to the vertical stabilizer, and the straight line for the other pair is perpendicular to the vertical stabilizer.

6. An aircraft comprising in combination:

a fuselage with a longitudinal fuselage axis;

a nose on a forward end of the fuselage;

a tail section including a vertical stabilizer on a rearward end of the fuselage;

a pair of wings extending laterally from the fuselage;

a propulsion means for propelling the aircraft;

the aircraft having a wing axis extending parallel with the wings and perpendicular to the fuselage axis;

the aircraft having a vertical stabilizer axis extending parallel with the vertical stabilizer and perpendicular to the fuselage axis, the aircraft being capable of landing and taking off on the tail section with the nose up and the fuselage axis vertical, and cruising with the fuselage axis horizontal;

four landing gears, each mounted to the aircraft and having a wheel rotatably mounted to a wheel axle, each landing gear having a support shaft which intersects the wheel axle perpendicular to the wheel axis;

two vertical stabilizer axis landing gears, each extending from the tail section on opposite sides of the fuselage axis, each with its support shaft parallel to the fuselage axis and contained in a single plane which parallels a plane containing the vertical stabilizer axis;

two wing axis landing gears, each extending rearward of the tail section on opposite sides of the fuselage axis, each with its support shaft parallel to the fuselage axis and contained in a single plane which parallels a plane containing the wing axis;

vertical stabilizer axis retaining means for locking the wheels of the vertical stabilizer axis landing gears from turning about their support shafts and for allowing the wheels of the vertical stabilizer axis landing gears to roll only parallel to the vertical stabilizer axis; and wing axis retaining means for locking the wheels of the wing axis landing gears from turning about their support shafts and for allowing the wheels of the wing axis landing gears to roll only parallel to the wing axis, for allowing any of the wheels to roll if while landing only one wheel touches ground and for preventing translational movement of the aircraft when all four of the wheels touch ground.

7. The aircraft according to claim 6 wherein the vertical stabilizer axis retaining means locks the wheels of the vertical stabilizer axis landing gears with their wheels axles parallel to each other and perpendicular to the vertical stabilizer axis.

8. The aircraft according to claim 7 wherein the wing axis retaining means locks the wheels of the wing axis landing gears with their wheels axles parallel to each other and perpendicular to the wing axis.

* * * * *